A. C. DEAN.
SAFETY STOP FOR SAWMILL ENGINES.
APPLICATION FILED NOV. 9, 1909.
975,216.
Patented Nov. 8, 1910.
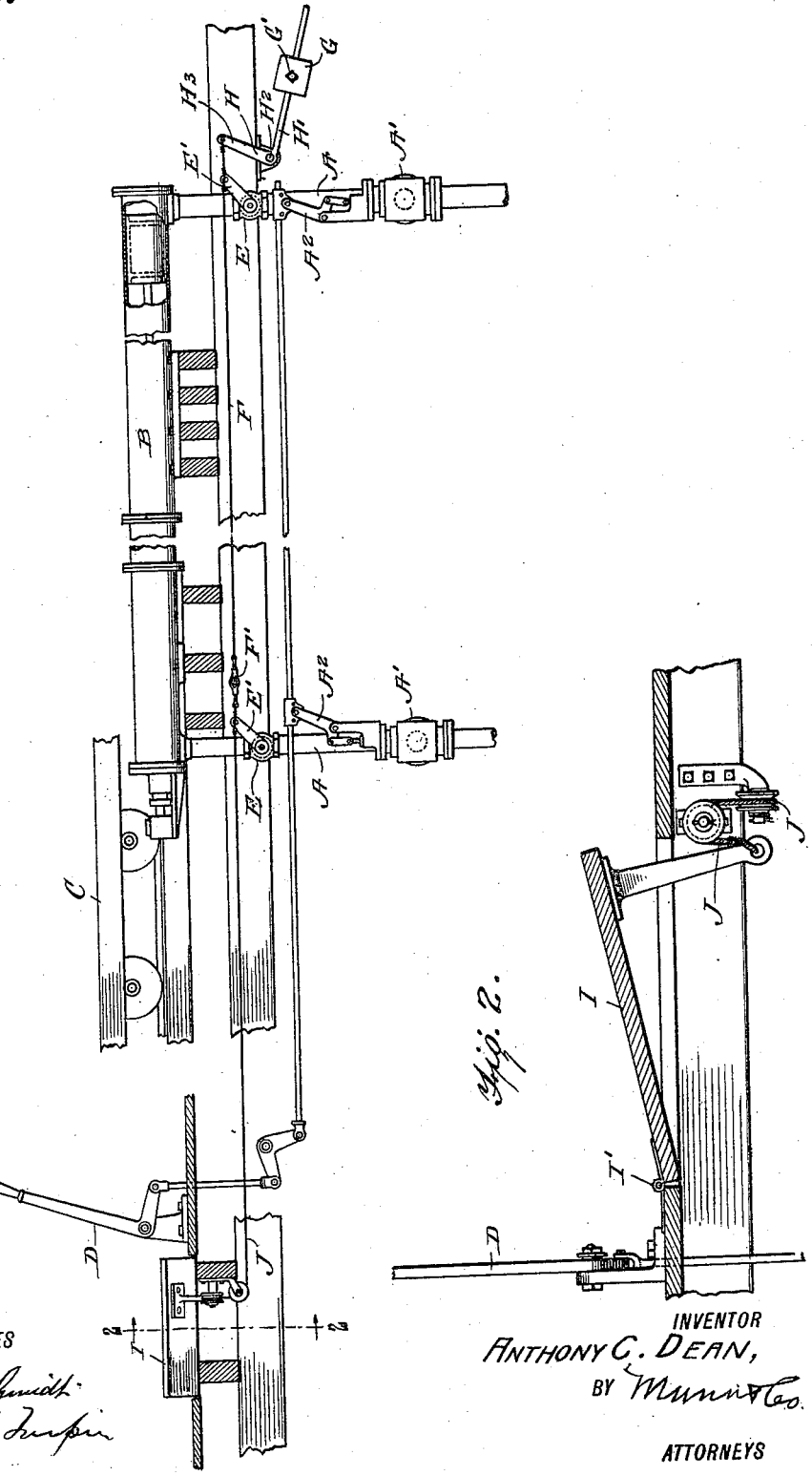
WITNESSES
INVENTOR
Anthony C. Dean,
BY
ATTORNEYS

UNITED STATES PATENT OFFICE.

ANTHONY C. DEAN, OF OVERHILL, WEST VIRGINIA.

SAFETY-STOP FOR SAWMILL-ENGINES.

975,216. Specification of Letters Patent. Patented Nov. 8, 1910.

Application filed November 9, 1909. Serial No. 527,080.

*To all whom it may concern:*

Be it known that I, ANTHONY C. DEAN, a citizen of the United States, and a resident of Overhill, in the county of Upshur and State of West Virginia, have invented certain new and useful Improvements in Safety-Stops for Sawmill-Engines, of which the following is a specification.

This invention is an improvement in saw mill carriages and particularly in the steam feeding mechanism thereof and has for an object to provide a novel construction in the form of a safety platform upon which the sawyer will ordinarily stand in operating the saw mill, which platform will be connected with supplemental valves in the steam feed pipes so that the movement of the platform will control the supplemental valves in such manner that when the sawyer steps off the platform the supplemental valves will be automatically closed, shutting off the supply of steam and stopping the feed. This is desirable in cases where the valve mechanism of the feed pipes becomes stuck from any cause or otherwise inoperative or the sawyer's lever becomes clogged or otherwise inoperative or in cases where it is necessary for the sawyer to instantly leave the lever as when a band saw or other part of the mill becomes broken requiring the sawyer to jump quickly to a point of safety.

The invention consists in certain novel constructions and combinations of parts as will be hereinafter described and claimed.

In the accompanying drawing Figure 1 is a side elevation partly in section and partly broken away of a saw mill embodying my invention and Fig. 2 is a cross section on about the line 2—2 of Fig. 1.

In carrying out the invention in the construction shown, I provide feed pipes A leading to the cylinder B, the said cylinder being connected in the usual manner with the saw mill carriage C in such manner as to operate the carriage as is well known to those skilled in this art. In connection with the feed pipes A, I employ a valve mechanism controlling the feed of steam and this valve mechanism is operated by the sawyer's lever D. As shown, separate valves A' are provided in the pipes A and these valves A' have bell crank arms A² which are connected together and also with the sawyer's lever so the movements of the lever in the usual way will operate the valves to control the feed of steam to the cylinder. Manifestly the valve mechanism for controlling the feed may be varied, my invention relating to the safety stop for insuring the cutting off of steam when the sawyer leaves his position for any reason, such for instance, as before suggested. In carrying out this feature of my invention, I provide in the feed pipes A, supplemental valves E which are shown as rocking valves supplied with crank arms E' and the arms E' of the two valves are connected by any suitable form of connection such as a cable or rod as shown at F which may preferably be supplied with a turn-buckle F' in order to take up slack and secure the desired adjustment of the parts.

A weight G is provided in connection with the crank arms for operating the same to automatically close the supplemental valves. This weight G is shown as adjustable along one arm H' of a lever H, said lever H being pivoted at H² and having its other arm H³ connected with one of the arms E' of one of the supplemental valves and the weight may be secured in any desired adjustment by means of a screw G' as will be understood from Fig. 1 of the drawing. This weight, it will be noticed, operates to close the supplemental valves when free to operate, and when the valves are opened by the depression of the movable sawyer's platform I, as more fully described hereinafter, the weight will be lifted so that it will operate forcibly when pressure on the platform is released, to close the valves E and shut off the feed of steam to the cylinder, whether the steam is being so fed to one or the other end of the cylinder as the case may be in the operation of the feed.

The movable sawyer's platform I is arranged adjacent to the sawyer's lever D so the sawyer will necessarily stand on the platform when in position to operate the said lever and the platform is movable down and up so that the weight of the sawyer will depress the platform when he stands thereon in position to operate the lever. The platform is connected with the supplemental valves by a chain or a cable J so that when the sawyer stands on the platform and depresses the said platform the cable or chain J will be drawn upon in such manner as to open the supplemental valves in the feed pipes, so that steam may pass freely to the cylinder under the control of the ordinary valve mechanism which latter is controlled by the sawyer through his lever D in the ordinary manner.

As shown, the cable J is guided in its passage between the movable sawyer's platform and the supplemental valves in such manner as to secure the opening of the supplemental valves when the platform is depressed as before described.

As shown, the platform I is hinged at one end I' and is movable vertically at its other end, upon which latter stands the sawyer when operating the mill, and this construction may be regarded as preferable because of its simplicity and the certainty of its operation.

By the described construction it will be noticed that the weight of the sawyer standing on the platform opens the supplemental valves against the stress of the weight G and the said weight will instantly and automatically close the supplemental valves when the sawyer gets off the platform.

In the operation of the mill, it sometimes happens that the valve mechanism controlling the passage of steam to the cylinder becomes clogged and sticks from one cause or another and the sawyer's lever and the connections between the same and the controlling valves sometimes, from various causes, become inoperative and there are times when it is necessary for the sawyer to quickly jump out of the way and away from the sawyer's lever to save himself from injury when the band saw or other parts of the mill are broken or otherwise thrown out of operation. In such case the instant the sawyer steps from his platform, the supplemental valves will be closed, shutting off the feed of steam to the cylinder and the carriage will come at once to a standstill avoiding any injury such as would result from the uncontrolled feed of the carriage.

I claim:

1. The combination with the steam feed for saw mills including the cylinder and the feed pipes leading thereto and valve mechanism controlling the feed of steam, of a movable sawyer's platform, supplemental valves in the feed pipes and intermediate connections between the supplemental valves and the sawyer's platform whereby the movement of the sawyer's platform may operate the supplemental valves, substantially as set forth.

2. In a steam feed for saw mills, the combination with the cylinder and the two feed pipes leading thereto, of supplemental valves in the feed pipes, a weight for closing said valves, a movable sawyer's platform and connections between said platform and the supplemental valves whereby the movement of the platform may open the valves in opposition to the closing weight, substantially as set forth.

3. The combination in a saw mill feed with the cylinder, and the feed pipes, of supplemental valves in the feed pipes and provided with crank arms, a connection between the crank arms of the supplemental valves, a weight operating to close said valves, a movable sawyer's platform, and devices connecting the sawyer's platform with one of the valves whereby the movement of the platform may operate the valves in opposition to the weight, substantially as set forth.

4. The combination in a saw mill feed with the cylinder and the feed pipes leading thereto, of supplemental valves in the feed pipes, a movable sawyer's platform, connections between the platform and the valves whereby the depression of the platform will operate to open the supplemental valves and means for closing the said valves when pressure on the platform is removed, substantially as set forth.

5. The combination in a saw mill feed with the cylinder and two feed pipes leading thereto, of supplemental valves in each of said pipes and a movable sawyer's platform connected with the supplemental valves to operate the same in one direction, and means for automatically re-adjusting the supplemental valves, substantially as set forth.

6. The combination in a saw mill feed with the cylinder, a pair of feed pipes leading thereto, valve mechanism controlling the feed to the cylinder supplemental valves, a sawyer's lever connecting said valve mechanism whereby to operate the same, and a movable sawyer's platform adjacent to said lever, and connections between said platform and the supplemental valves substantially as set forth.

ANTHONY C. DEAN.

Witnesses:
  Solon C. Kemon,
  Perry B. Turpin.